May 18, 1926.
H. BODAN
AUTOMOBILE CURTAIN CLAMP
Filed March 26, 1925
1,585,228
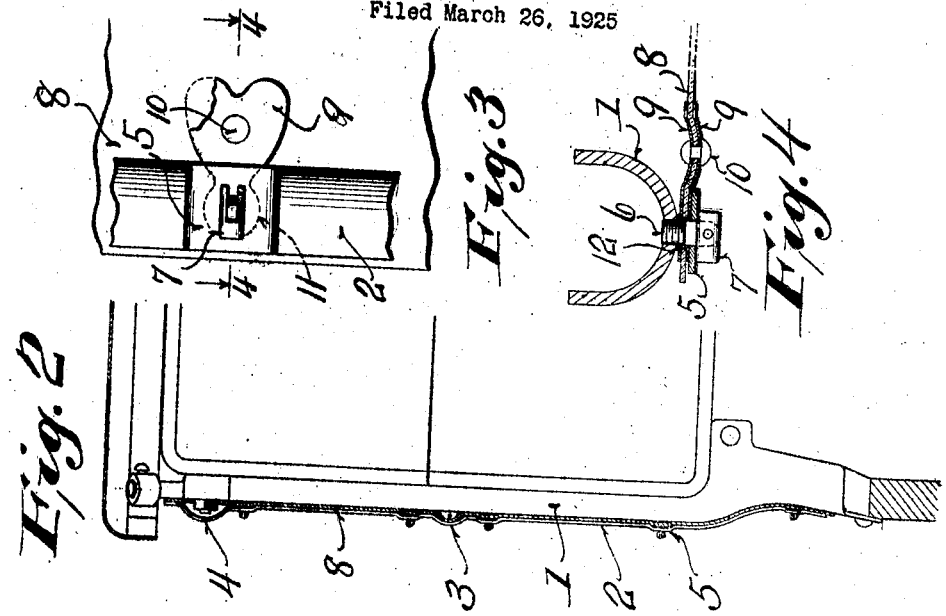
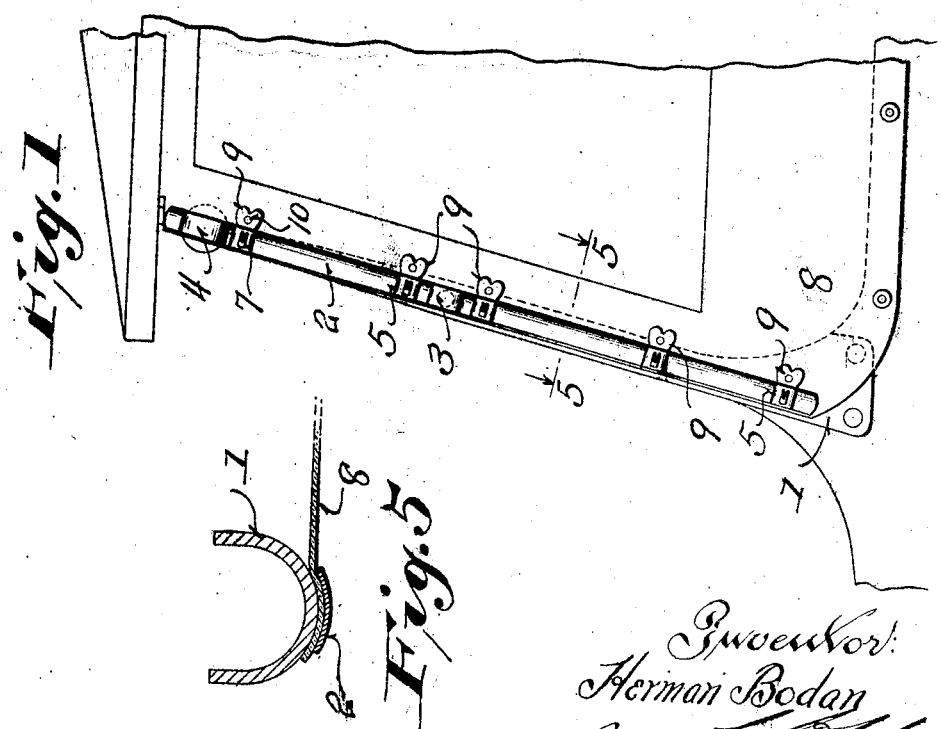

Patented May 18, 1926.

1,585,228

UNITED STATES PATENT OFFICE.

HERMAN BODAN, OF SAUKVILLE, WISCONSIN.

AUTOMOBILE CURTAIN CLAMP.

Application filed March 26, 1925. Serial No. 18,467.

This invention relates to an automobile curtain clamp.

In an automobile provided with a canopy top, it has been the practice to attach the curtain at spaced points to the frame of the top and the machine with the result that the curtain soon sagged and opened up particularly along its front edges and admitted rain and wind.

This invention overcomes the above noted defects, and objects of such invention are to provide a curtain clamp which may be attached to the wind shield support of a standard automobile, which will clamp the edges of the curtain tightly against such support and prevent sagging and entrance of wind, and which is so constructed that the fasteners for the clamp detachably hold it in position and provide for the drawing of the clamp tightly against the outer side of the curtain, thus forcing the curtain into binding engagement with the wind shield support.

Further objects are to provide a curtain clamp which will not damage the curtain, and which is so associated with reinforcing means carried by the curtain as to prevent tearing of the curtain at the eyelets.

An embodiment of the invention is shown in the accompanying drawings, in which:—

Figure 1 is a side elevation of the front portion of an automobile showing the clamp in position.

Figure 2 is a sectional view looking from the rear of Figure 1.

Figure 3 is an enlarged view of one of the fastening means and the associated portions of the device.

Figure 4 is a sectional view on the line 4—4 of Figure 3.

Figure 5 is a sectional view on the line 5—5 of Figure 1.

Referring to the drawings, it will be seen that the automobile has been shown as equipped with the standard wind shield upright or support 1, which, as shown in Figures 4 and 5, is semi-cylindrical throughout its major portion.

The curtain clamp comprises an elongated transversely curved strip 2 of metal which conforms to the curvature of the major portion of the wind shield support, as shown in Figure 5. It is to be understood that one of these clamping strips is positioned on each side of the front of the automobile.

It will be noted from Figure 2 that the strip 2 is curved at its lower portion to fit the inwardly curving part of the wind shield 1. Also this curtain support is bowed outwardly, as indicated at 3 and 4 to accommodate the wind shield bolts or screws.

It is to be noted further that at spaced points along the strip 2, it is provided with raised flat faces 5. These flat faces or flattened portions 5 are apertured and permit the passage therethrough of the clamping screws.

The clamping screws are provided with a threaded body portion 6 which is screwed into a tapped hole formed in the wind shield support 1 as most clearly shown in Figure 4. These screws are each provided with a pivoted cylindrical head 7 which may be turned transversely of the screw axis, when desired, or may extend outwardly as a continuation of the screw body.

The curtain 8 is provided with reenforcing plates 9 on opposite sides, as shown in Figures 1, 2 and 4. These reenforcing plates are preferably curved, as shown in Figure 4, and a rivet 10 is passed through such curved portion. It is to be noted that the curved portion is of relatively large extent and provides an adequate bearing arrangement for the plates 9 against the curtain 8. The forward portions of these reenforcing plates are of reduced width, as shown most clearly in Figure 3, and are preferably provided with rounded outer ends 11. These rounded outer ends 11 are apertured and one of the ends, for instance, the outer one, is provided with inturned flanges, as shown in Figure 4, and indicated by the reference character 12. These flanges are slipped through an aperture in the curtain 8 and through an aperture in the inner plate, and are, thereafter, riveted or swaged outwardly into interlocking engagement with the inner clip or reenforcing plate. These clips, it will be noted, materially reenforce the curtain at the apertures and engage the curtain at spaced points and clamp it between them throughout their extent.

In using the device the screws 6 are assumed as having been screwed into the wind shield support 1. The outer ends 7 of the screws are turned into alignment with their body portion 6 and the curtains are slipped over the screws. Thereafter, the clamping plates 2 are positioned with the screws passing through the apertures in the plates. The outer portion 7 of the screws are then turned transversely of their body portions, as shown in Figure 4, and the screws are screwed up tight so as to clamp the strip 2 tightly against the curtain and bind the curtain tightly against the wind shield support.

It is to be noted that this additional turning of the screws to clamp the strips 2 in position is easily effected due to their transverse portion 7 which may be used to manipulate the screws without requiring the use of an auxiliary tool.

Obviously, when it is desired to remove the curtain it is merely necessary to slightly unscrew the screws and turn the outer portion 7 into alignment with the body portion 6. Thereafter, the strips 2 may be most readily removed together with the curtains 8. If desired, the strips may be replaced and the screws 7 tightened, as previously described.

It will be seen that a very simple and effective type of curtain clamp has been provided which will hold the forward end of the curtain tightly against the wind shield support and will prevent sagging of the curtain and will also prevent entrance of rain or wind.

It is to be noted that the curtain clamp is very simple in construction and may be cheaply and readily produced.

Although the invention has been described in considerable detail, it is to be understood that the invention may be variously embodied and is, therefore, to be limited only as claimed.

I claim:

The combination of a wind shield support for an automobile having screw threaded apertures therein, a curtain having eyelets corresponding to said apertures, a clamping member conforming to said wind shield support and positioned outside of said curtain, and having apertures aligning with said first mentioned apertures, a plurality of screws passing through said apertures in said clamping member and the eyelets in said curtain and screwed into the threaded apertures in said wind shield support, said screws being adapted for free rotary motion to tighten or loosen the clamping strip, and having pivoted portions at their outer ends adapted to be turned transversely to serve as manipulating members for screwing the screws into binding engagement and also as locking members to prevent inadvertent detachment of the clamping member and of the curtain.

In testimony that I claim the foregoing I have hereunto set my hand at Milwaukee, in the county of Milwaukee and State of Wisconsin.

HERMAN BODAN.